United States Patent

Kobayashi et al.

[11] Patent Number: 5,281,470
[45] Date of Patent: Jan. 25, 1994

[54] VIBRATION DAMPER

[75] Inventors: Kohji Kobayashi, Hashima; Mitsuo Kurita, Kagamihara; Yasuyuki Ohira, Seki; Yoshihisa Takano, Minokamo, all of Japan

[73] Assignee: CCI Co., Ltd., Hashima, Japan

[21] Appl. No.: 798,282

[22] Filed: Nov. 25, 1991

[30] Foreign Application Priority Data

Mar. 1, 1991 [JP] Japan .................. 3-035809
Mar. 18, 1991 [JP] Japan .................. 3-052656
Aug. 30, 1991 [JP] Japan .................. 3-219513

[51] Int. Cl.⁵ .................. B32B 5/16; B32B 27/12
[52] U.S. Cl. .................. 428/241; 252/62.9; 428/240; 428/283; 428/408; 428/902; 428/284
[58] Field of Search .................. 252/62.9; 310/311, 325, 310/326, 348, 368; 428/224, 228, 225, 408, 413, 240, 241, 902, 283, 284; 264/56, 60, 103, 61, 104, 257

[56] References Cited

U.S. PATENT DOCUMENTS

| | | | |
|---|---|---|---|
| 4,128,489 | 12/1978 | Seo | 252/62.9 R |
| 4,412,148 | 10/1983 | Klicker et al. | 310/311 |
| 4,565,940 | 1/1986 | Hubbard, Jr. | 310/311 |
| 4,595,515 | 6/1986 | Wakino et al. | 310/326 |
| 4,726,099 | 2/1988 | Card et al. | 252/62.9 R |
| 4,783,300 | 11/1988 | Grunwell | 264/331.18 |
| 4,873,149 | 10/1989 | Shinoda et al. | 428/594 |
| 5,169,551 | 12/1992 | Tsunooka et al. | 264/56 |

FOREIGN PATENT DOCUMENTS

| | | | |
|---|---|---|---|
| 61-46498 | 10/1986 | Japan . | |
| 63-126283 | 5/1988 | Japan | 310/311 |
| 63-233578 | 9/1988 | Japan | 310/311 |
| 2-52474 | 2/1990 | Japan | 310/311 |
| 2237928 | 5/1991 | United Kingdom | 252/62.9 X |

*Primary Examiner*—Jeffery Thurlow
*Assistant Examiner*—Mathieu Vargot
*Attorney, Agent, or Firm*—Lorusso & Loud

[57] ABSTRACT

A vibration damper of a high polymer resin sheet which contains epizoelectric ceramic powder and a cloth layer placed therein including carbon fibers, which provides excellent as well as consistent and reliable damping effects in a relatively wide temperature range and also a method for producing the vibration damper.

12 Claims, 8 Drawing Sheets

VIBRATION DAMPER

BACKGROUND OF THE INVENTION

1. Field of the Invention

This invention relates to a damper which can damp vibration generated mainly by a vibratory body and more particularly relates to a damper comprising a high polymer sheet which contains piezoelectric ceramic powder and a cloth layer placed therein which essentially comprises carbon fibers, and this invention further relates to a method for producing such a damping composition.

2. Description of the Prior Art

In a conventional damper which transforms the vibratory energy generated by a vibratory body into electrical energy, which is then to be transformed into thermal energy to be dissipated, said vibratory energy is transformed into electrical energy by means of a piezoelectric body functioning as a medium to which an external resistor or external resistors are at times connected as a medium for transforming said electrical energy into thermal energy.

The connection work of such external resistors to a piezoelectric body, however, often becomes a cause of trouble, and further such external resistors usually extrude from a piezoelectric body obstructing attachment of a damper to a vibratory body, resulting in limitation to the use of such a damper.

Recently a piezoelectric body with carbon powder or the like mixed therein instead of using an external resistor was proposed (Japanese Patent Publication No. 61-46498).

Said piezoelectric body containing carbon powder or the like does solve said trouble caused by installation of external resistors, however, it possesses the following shortcomings:

a) it is technically hard to evenly mix carbon powder or the like in a piezoelectric body, resulting in dispersion of resistivity per manufactured damping body, therefore leading to inconsistency of damping effects; and b) it takes relatively a long time (30 min. to 60 min.) to mix carbon powder or the like well in a piezoelectric body, resulting in lowering productivity.

SUMMARY OF THE INVENTION

It is, therefore, an object of the present invention to provide a damper which give a consistent damping effect helped by their substantially identical resistivities.

It is a further object of the present invention to provide a method for efficiently producing such a damper.

With the above and other objects in view, a feature of the present invention is the provision of a damping composition as will hereinafter appear.

A further feature of the present invention is the provision of efficiently producing such a damper as will hereinafter appear.

The damper of the present invention can be utilized in various fields, such as for electronics appliances, sound appliances and around car engines.

The above and other features of the present invention will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which are shown illustrative embodiments of the invention from which its novel features and advantages will be apparent.

In the drawings.

DESCRIPTION OF THE PREFERRED EMBODIMENT

Referring to the drawings, there will be seen hereinafter illustrative dampers of the present invention.

Figure 1:
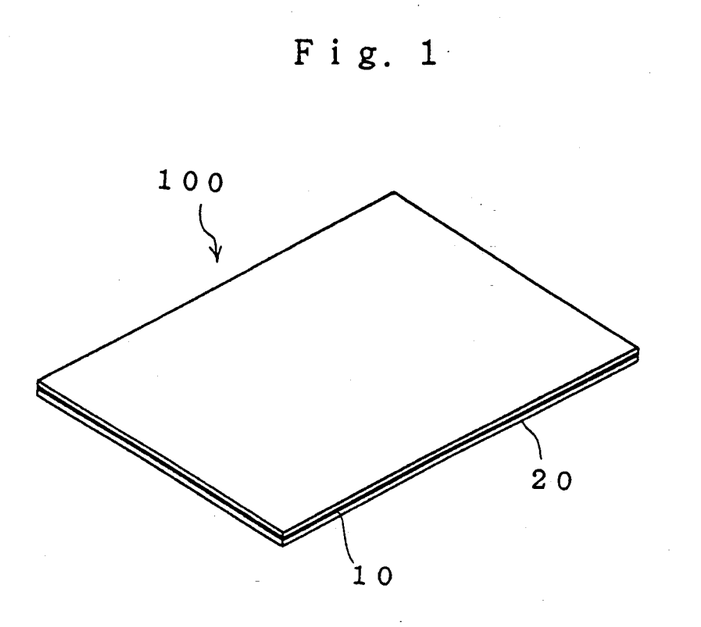
FIG. 1 is a perspective view showing a damper of the present invention.

There is shown in FIG. 1 one embodiment of a damper 100 comprising a high polymer resin sheet 20 which contains piezoelectric ceramic powder and a cloth layer 10 placed therein which essentially comprises carbon fibers.

Figure 2:
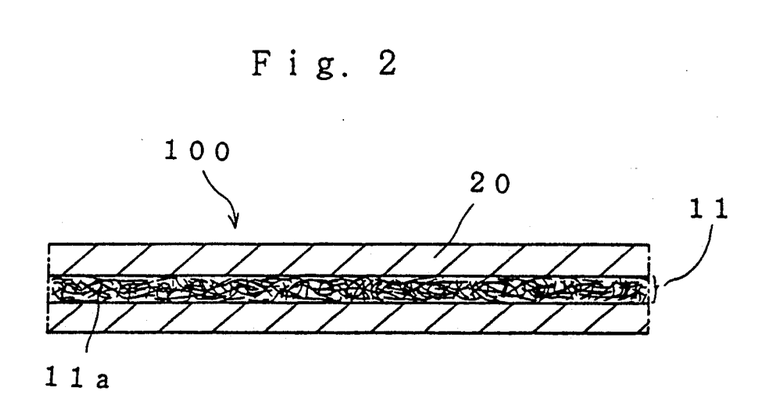
FIG. 2 is a cross-sectional view showing an enlarged partial cross-section of the damper of Embodiment 1.

Another embodiment of a damper 100, as shown in FIGS. 1 and 2, includes a cloth layer 10 which comprises a non-woven fabric layer 11 comprising carbon fibers.

Figure 4:
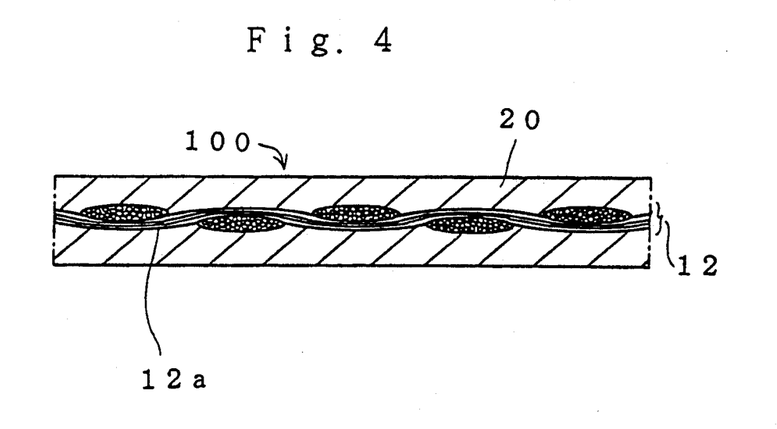
FIG. 4 is a cross-sectional view showing an enlarged partial cross-section of the damper of Embodiment 2.

Alternatively a damper 100, as shown in FIGS. 1 and 4, includes a cloth layer 10 which comprises a woven fabric layer 12 comprising carbon fibers.

Figure 6:
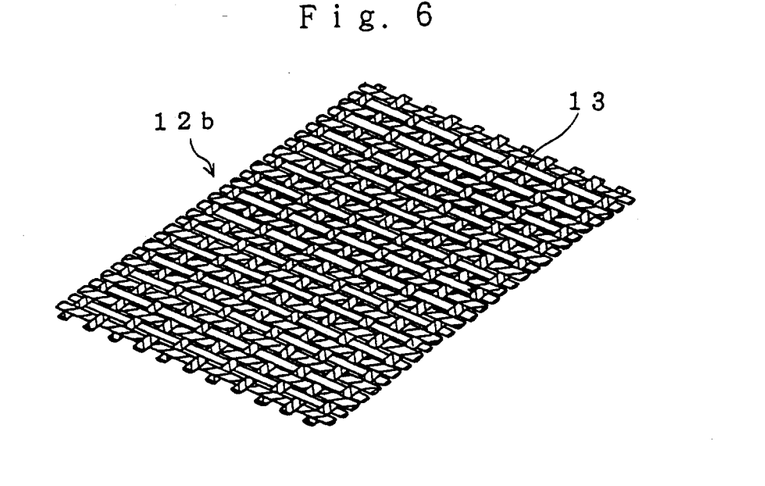
FIG. 6 is a perspective view showing another woven fabric layer of carbon fibers.

As shown in FIGS. 1, 4 and 6, a damper 100 includes a cloth layer 10 which comprises a woven fabric layer 12 partially comprising glass fibers.

Figure 7:
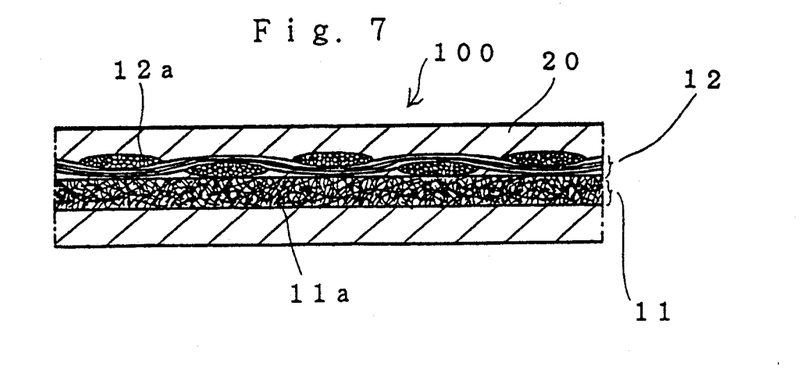
FIG. 7 is a cross-sectional view showing an enlarged partial cross-section of the damper of Embodiment 3.

Yet another embodiment of a damper 100, as shown in FIGS. 1 and 7, includes a laminated cloth layer 10 which comprises a non-woven fabric 11 layer of carbon fibers and a woven fabric layer 12 of carbon fibers.

The dampers of the present invention can be produced using one of the following methods. One method includes the steps of:

(1) applying a liquid high polymer resin compound containing piezoelectric ceramic powder on to a cloth layer comprising carbon fibers, and (2) hardening the resin compound and the cloth layer by means of a heat press.

The other method includes the steps of:
(1) placing a cloth layer comprising carbon fibers in a mold,
(2) injecting a liquid high polymer resin compound containing piezoelectric ceramic powder into said mold, and
(3) hardening the resin polymer and the cloth layer by means of a heat press.

The present invention will be further described in greater detail hereinafter.

With regard to the damper 100 shown in FIG. 1, when vibratory energy is externally generated, the vibratory energy is transformed into electrical energy by means of a high polymer resin sheet 20 containing piezoelectric ceramic powder. And said electrical energy is then transformed into thermal energy by means of a cloth layer 10 comprising carbon fibers.

Said cloth layer 10 placed in said high polymer resin sheet 20 forms a conductive pass and functions as a resistor as well.

With regard to the damper 100 shown in FIGS. 1 and 2, the non-woven fabric layer 11 comprising carbon fibers forms a conductive pass by way of the entangled conductive fibers, and also functions as a resistor. Electrical energy conducted therein is consumed as thermal energy.

Figure 8:
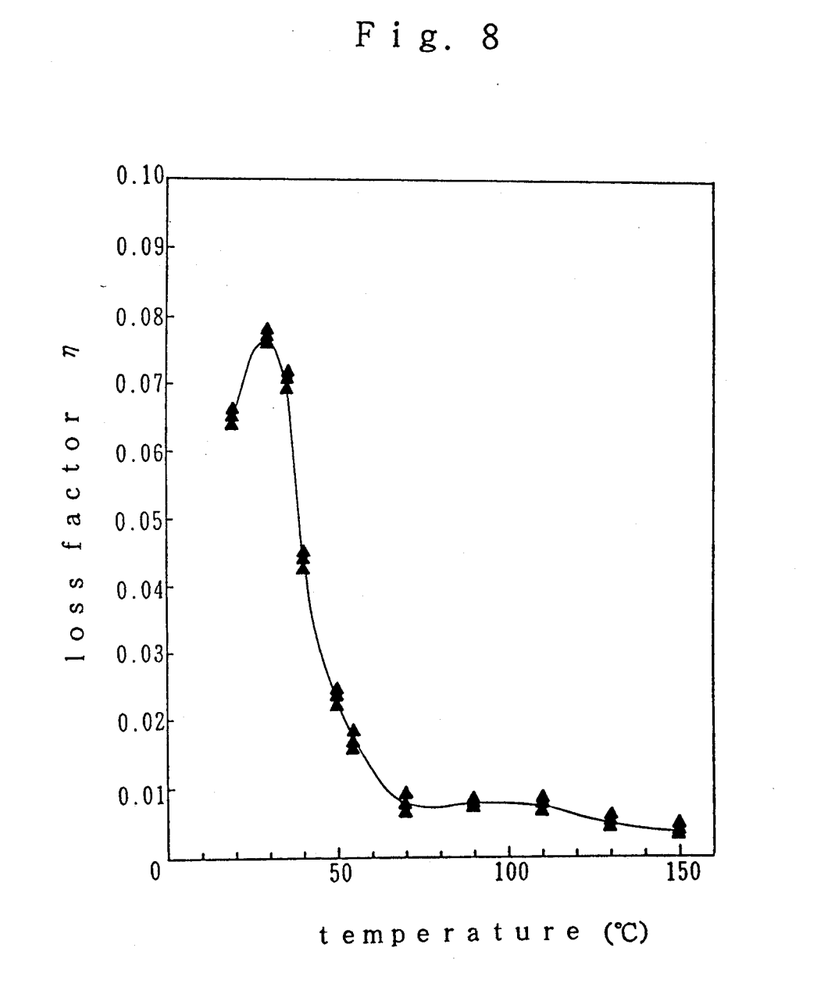
FIG. 8 is a graph showing relations between temperature and loss factor ($\eta$) for the dampers of Embodiment 1.

A desired resistivity for the above damper 100 can be obtained by adjusting the thickness of the contained carbon fibers and/or the density of the non-woven fabric layer 11. A consistent resistivity for dampers of the identical structure can be obtained, for the carbon fibers in the non-woven fabric layers 11 used therein are uniformly distributed and therefore the transformation from electrical energy into thermal energy is always performed under the same condition, resulting in consistent damping effects as are shown in FIG. 8.

Figure 9:
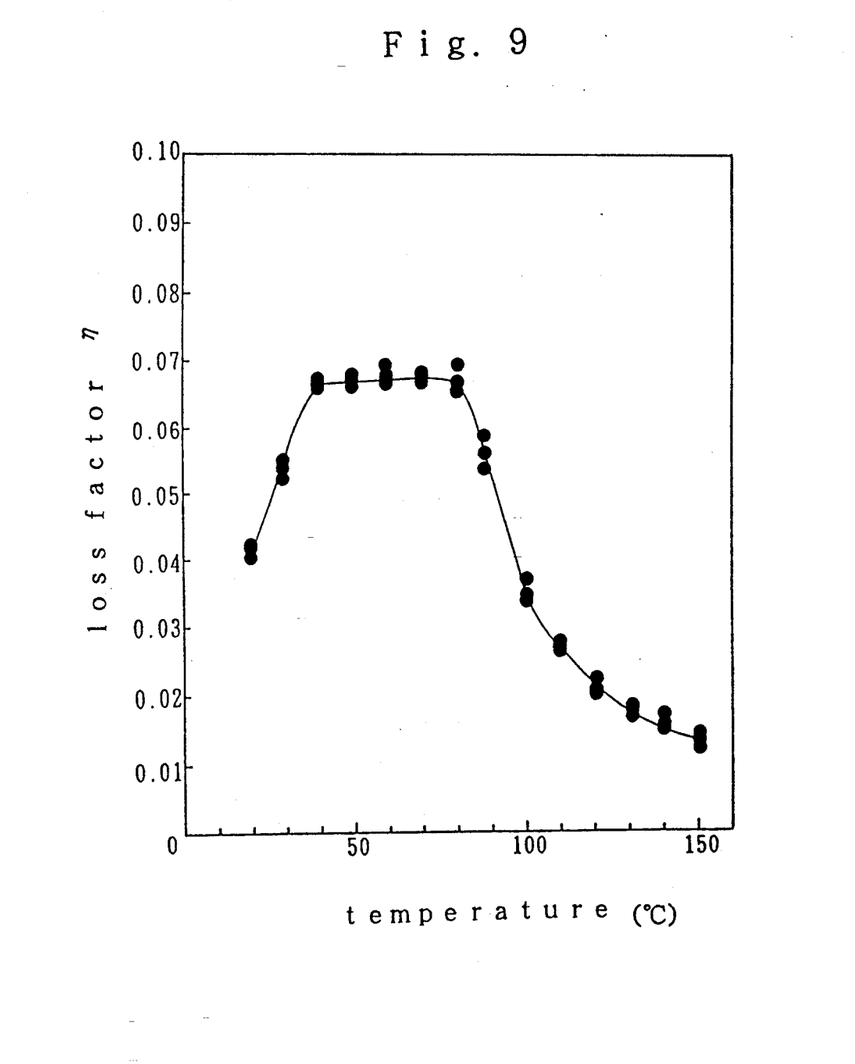
FIG. 9 is a graph showing relations between temperature and loss factor ($\eta$) for the dampers of Embodiment 2.

With regard to the damper 100 shown in FIGS. 1 and 4, the woven fabric layer 12 comprises totally or partially carbon fibers which are distributed therein in uniformity and provides a conductive pass as well as functions as a resistor. Electrical energy conducted therein is consumed as thermal energy, and thus vibration from a vibratory body is dissipated. This damping effect appears outstandingly at the temperature range from 30° C. to 90° C., and hardly fluctuates at the temperature range between 40° C. and 80° C., as shown in FIG. 9.

It is not clearly known why the damping effects in the temperature range 40° C. to 80° C. hardly fluctuate. However, an explanation would be that carbon fibers forming a woven fabric layer 12 possess an excellent thermal resistivity and are uniformly disposed as a continuous body forming a consistent and stable conductive pass.

A desired resistivity for the above damper 100 can be obtained by adjusting the thickness of the carbon fibers used therein and/or the density of the woven fabric layer 12, and/or by adjustingly forming the woven fabric layer 12 with carbon fibers and other fibers which possess a good thermal resistivity.

With regard to the damper 100 shown in FIGS. 1, 4 and 6, the woven fabric layer 12 comprises carbon fibers and glass fibers 13 which are nonconductive, as shown in FIG. 6. Comprising as such, the resistivity of the woven fabric layer 12 can be upwardedly adjusted, as glass fibers possess a good thermal resistivity, and therefore they contribute to damping effects of the damper 100 in a higher temperature range.

With regard to the damper 100 shown in FIGS. 1 and 7, the damper 100 includes a laminated layer of a woven fabric layer 12 comprising carbon fibers and a non-woven fabric layer 11 comprising carbon fibers, and the damping effects show a high peak in the temperature range 30° C. to 40° C., staying high up to 80° C.

It is not clearly known why such a high peak appears in the temperature range 30° C. to 40° C. However, an explanation would be that multiple functions of both the woven fabric layer 12 and the non-woven fabric layer 11 are involved. The reason why high damping effects are retained up to as high as 80° C. would be that in addition to said reason, carbon fibers used in both the fabric layers possess an excellent thermal resistivity.

A desired resistivity for the above damper 100 can be obtained by adjusting the thickness of the carbon fibers and/or the density of the woven fabric layer 12 and/or that of the non-woven fabric layer 11, and/or providing the carbon fibers with other fibers such as inorganic fibers, metallic fibers or synthetic fibers which possess a good thermal resistivity.

Figure 3:
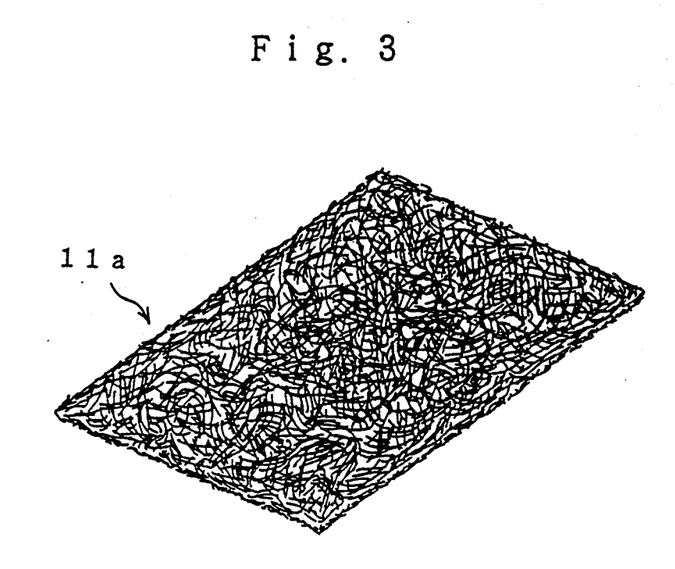
FIG. 3 is a perspective view showing a non-woven fabric layer of carbon fibers.
Figure 5:
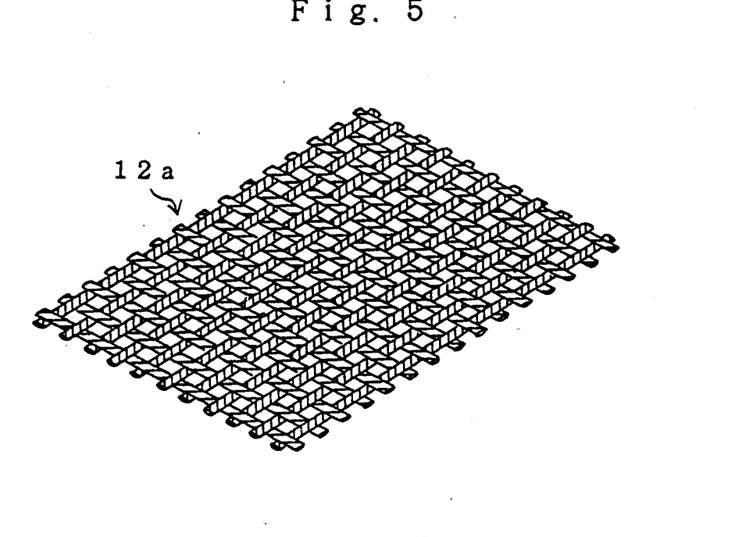
FIG. 5 is a perspective view showing a woven fabric layer of carbon fibers.

With regard to one method for producing a damper, a liquid high polymer resin compound containing piezoelectric ceramic powder is applied on to a fabric 11a, 12a or 12b comprising carbon fibers as is shown in FIG. 3, 5 or 6 and a cloth layer 10 can be obtained as a resistor. There is no need for mixing carbon powder, eliminating a process.

And with regard to the other method for producing a damper, a liquid high polymer resin compound containing piezoelectric ceramic powder is injected into a mold in which a fabric 11a, 12a or 12b comprising carbon fibers is placed and a cloth layer 10 comprising carbon fibers is obtained as a resistor. Therefore, no mixing process is required. It is possible to obtain a damper of a desired shape by selecting a mold for the desired shape.

The followings are more detailed descriptions of embodiments of the present invention.

EMBODIMENT 1

As is shown in FIGS. 1 to 3, a damper 100 of Embodiment 1 comprises a high polymer resin sheet 20 essentially comprising an epoxy resin (EPIKOTE 807 of Yuka Shell Epoxy Co., Ltd.) and a curing agent (Elasma 1000 of Ihara Chemical Co., Ltd.) and a non-woven fabric layer 11 placed therein comprising a non-woven fabric 11a which comprises carbon fibers (DONA CARBO PAPER S-256 of Nihon Itagarasu Co., Ltd.).

Said high polymer resin sheet 20 contains 80 W % of piezoelectric ceramic powder of lead titanate zirconate compositions (PZT).

If desired in order to adjust resistivity for said damper 100, said non-woven fabric layer 11 may contain metalic fibers and/or synthetic fibers. The thickness of carbon fibers used therein and/or the density of said non-woven fabric layer 11 may also be adjusted. Said non-woven fabric layer 11 may comprise only one non-woven fabric 11a or a plurality of non-woven fabrics 11a.

The high polymer composition of Embodiment 1 comprises a flexible epoxy resin. The aim of using such a material is to obtain a good durability against bending. Other materials such as thermo-curing resins like phenol resins, thermo-plastic resins such as polypropylene, polyester, polystyrene and polyvinyl chloride, synthetic rubbers or natural rubbers may also be used. The high polymer resin sheet 20 may comprise, what is called, engineering plastics (such as super engineering plastics) formed by polycarbonate, polyacetal, polyamide or the like. In order to give piezoelectrical properties to said high polymer resin sheet 20 itself, fluorine-contained polymers may be used to form the resin sheet 20.

Said piezoelectric ceramic powder may also be barium titanate (BT), or lead lanthanate titanate zirconate compositions (PLZT) or a combination thereof.

EMBODIMENT 2

The damper 100 of Embodiment 2, as is shown in FIGS. 1, 4 and 5, comprises a flexible high polymer resin sheet 20 essentially comprising an epoxy resin (EPIKOTE 807 of Yuka Shell Epoxy Co., Ltd.) and a curing agent (Elasma 1000 of Ihara Chemical Co., Ltd.) and a woven fabric layer 12 placed therein comprising a woven fabric 12a. Said high polymer resin sheet 20 contains 80 W % of piezoelectric ceramic powder of PZT.

Said woven fabric 12a comprises warps and wefts of carbon fibers, however, a woven fabric 12b including glass fibers which replace every other warp or weft of the woven fabric 12a, such as shown in FIG. 6, may as well be used. Said glass fibers 13 of the woven fabric 12b may be included in both warps and wefts or may be included in any manner other than every other warp and/or weft. The glass fibers may be replaced by alamide fibers. Alamide fibers do not soften or melt by heat up to nearly 350° C., and are about five times as strong as iron fibers. Accordingly, a damping composition 100 comprising a woven fabric layer 12 which includes alamide fibers shows an excellent thermo-resistivity and a tension resistivity. The woven fabric 12b may include metalic fibers and/or inorganic fibers, or/and the thickness of carbon fibers therein and/or the density of the woven fabric 12b may be adjusted to obtain a desired electrical resistivity for the damper 100. The woven fabric layer 12 can comprise a single woven fabric 12a or 12b, or a plurality of woven fabrics 12a and/or 12b, or a combination thereof.

EMBODIMENT 3

The damper 100 of Embodiment 3, as is shown in FIGS. 1 and 7, comprises a high polymer resin sheet 20 essentially comprising an epoxy resin (EPIKOTE 807 of Yuka Shell Epoxy Co., Ltd.) and a curing agent (Elasma 1000 of Ihara Chemical Co., Ltd.) and also a laminated layer placed therein of a woven fabric layer 12 comprising a woven fabric 12a in which all warps and wifts are carbon fibers, as shown in FIG. 5, and a non-woven fabric layer 11 comprising a non-woven fabric 11a which comprises carbon fibers, as shown in FIG. 3. Said high polymer resin sheet 20 contains 80 W % of piezoelectric ceramic powder of PZT.

The woven fabric 12a and the non-woven fabric 11a can be naturally laminated since the resin used therein such as epoxy resin permiates into said woven fabric 12a and said non-woven fabric 11a, adhering both, however, if improvement of adhesion is desired, an adhesive may be applied beforehand on to both the woven fabric 12a and the non-woven fabric 11a.

The dampers 100 of Embodiments 1, 2 and/or 3 can be laminated in any combination to improve the damping effects.

A method for producing the dampers of Embodiments 1, 2 and 3 will be explained hereinafter.

PZT powder is mixed in a mixture essentially comprising an epoxy resin and a curing agent. The viscosity of the mixture containing PZT is somewhat 1000 to 20000 CPS. The PZT contained mixture is applied on to both surfaces of a non-woven fabric 11a or a woven fabric 12a, or a lamination thereof by means of roll coating or knife coating. Then a hot press plate is applied to the coated surfaces to harden the coating. The surface temperature of said plate is about 180° C. to 200° C.

Another method for producing the dampers of Embodiments 1, 2 and 3is explained hereinafter.

PZT powder is mixed in a mixture essentially comprising an epoxy resin and a curing agent. The PZT contained mixture is injected into a mold where a non-woven fabric 11a or a woven fabric 12a, or a lamination thereof is already placed. The bubbles generated in the resin should be carefully removed. The mold is then heated in a hot-air dryer and the resin hardens. The air temperature in the dryer is around 180° C. to 200° C.

Figure 10:
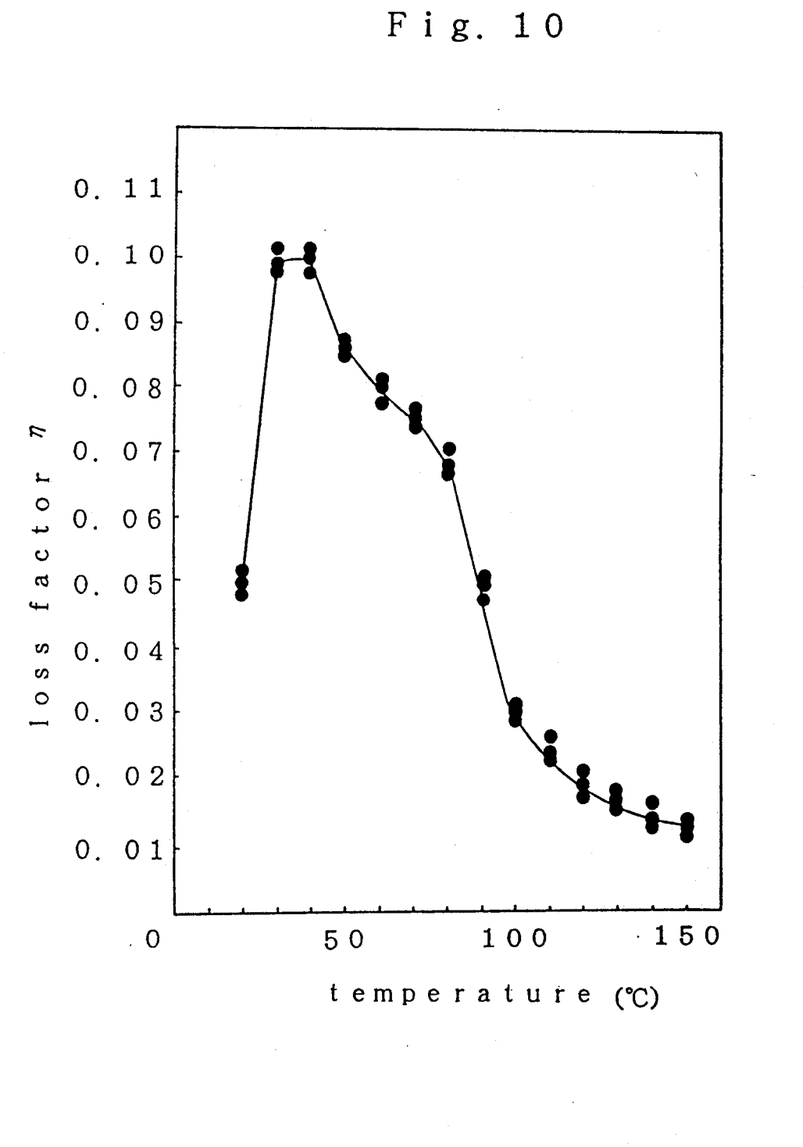
FIG. 10 is a graph showing relations between temperature and loss factor ($\eta$) for the dampers of Embodiment 3.

The damping effects of the dampers made according to the above-described methods were evaluated and the graphs of FIGS. 8, 9 and 10 showing the results were obtained.

Figure 11:
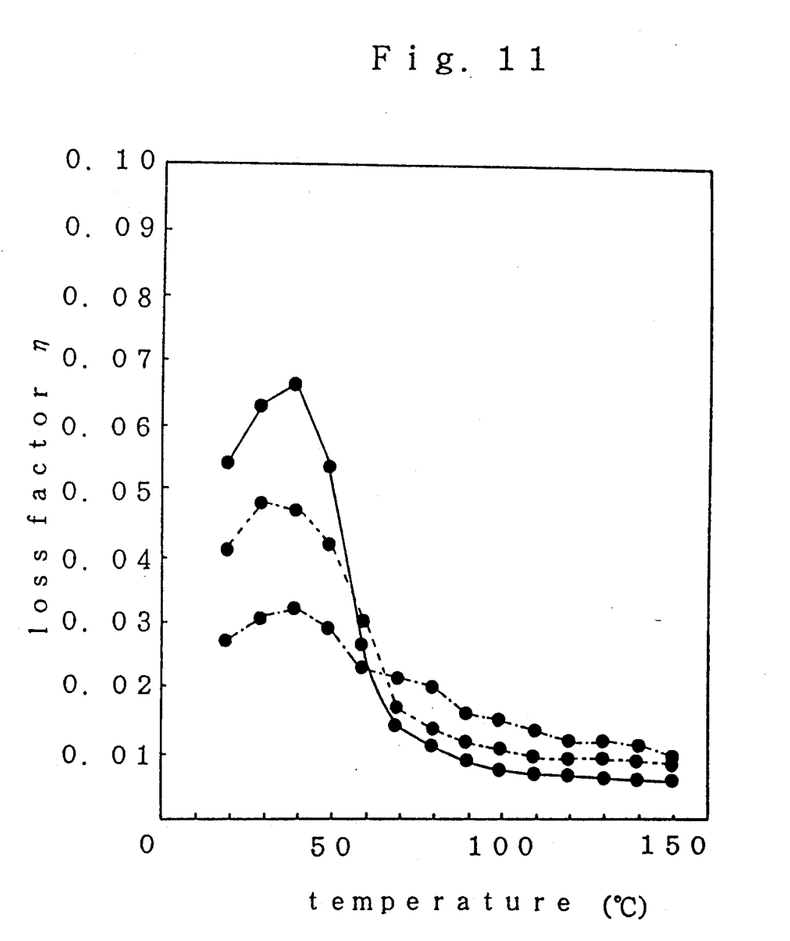
FIG. 11 a graph showing relations between temperature and loss factor ($\eta$) for conventional dampers.

For comparison, a conventional type of damper obtained by heat molding a mixture comprising a PZT contained epoxy resin and carbon powder mixed therein was also evaluated. The results are shown in FIG. 11.

Figure 12:
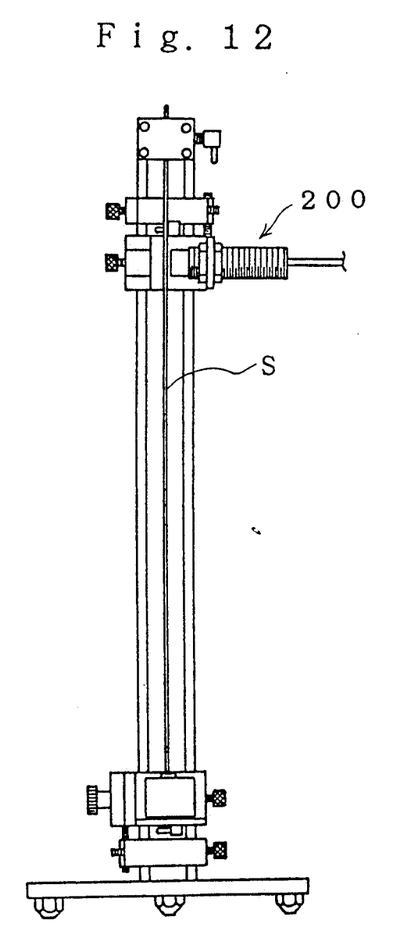
FIG. 12 is a front view of an electromagnetic vibration sensor.

An electromagnetic vibratory sensor 200 (MT-1, A202) of Denshi Sokuki Co., Ltd. was used for all the measurements of damping effects. The sizes of all the samples S were 136 mm × 15 mm × 1 mm. An iron plate of 1 mm thick was adhered with an adhesive on to a surface of each sample for measurements.

The loss factors were obtained by the following equation.

$$\eta = 2D/8.68 \times 2 \times 3.14 \times f_o$$

Wherein, D is decrement (amount of decrement in dB per second) and $f_o$ is a resonance frequency.

As is shown in FIG. 8, the measurements for the samples (N=3) of the dampers according to Embodiment 1 were nearly identical. That is, the dampers of Embodiment 1 possess a consistent and reliably stable damping effects.

As is shown in FIG. 9, the dampers of Embodiment 2 provide nearly consistent and stable loss factors in the relatively wide and high temperature range 40° C. to 80° C. All the samples (N=3) provided nearly identical measurements, showing that the dampers according to Embodiment 2 are consistent and reliably stable.

As is shown in FIG. 10, the damping compositions of Embodiment 3 show excellent damping effects in the temperature range 30° C. to 40° C. and retain high damping effects up to the temperature around 80° C. All the samples (N=3) provided nearly identical measurements, showing that the dampers according to Embodiment 3 are consistent and reliably stable.

In comparison, as is shown in FIG. 11, a conventional type of damper containing carbon powder mixed in a resin sheet thereof showed inconsistent measurements for each sample (N=3). Such conventional dampers do not provide efficient enough damping effects in the temperature range 30° C. to 40° C., and the loss factors drop sharply from the temperature around 50° C. The effective temperature range for damping is narrow and the damping effects deteriorate sharply over 50° C.

Thus, a damper of the present invention provides the following effects.

One embodiment of a damper of the present invention polymer sheet and a cloth layer placed therein as a resistor comprising carbon fibers which are evenly distributed always in an identical manner, and therefore the damper produced such provides a stable and consistent quality as a result of its nearly constant electrical resistivity.

The damper of another embodiment includes a cloth layer comprising a non-woven fabric layer which comprises carbon fibers and forms a conductive pass as well as a resistor, and the resistivity for the damper can be easily adjusted by adjusting the thickness of the non-woven fabric layer and/or its density, or by providing the non-woven fabric layer with inorganic fibers or/and metalic fibers, adding damping effects to the ones of the damping composition of claim 1.

The damper of a further embodiment includes a woven fabric layer comprising carbon fibers which are woven in a constant manner, and therefore this damper provides, in addition to the damping effects for the two above described embodiments, a wide and high temperature range of excellent damping effects. This damper provides consistent and reliable damping effects, which is not usually a case with a conventional type of damper in which resistivity often varies sample to sample because thermo-expansion rates of carbon powder used therein and a high polymer resin forming a piezoelectric body are different and therefore the carbon powder becomes unevenly distributed in the resin over a temperature around 50° C., leading to deteriorated energy conversion from electrical energy to thermal energy.

The damper of yet another embodiment includes a woven fabric layer which comprises carbon fibers and glass fibers. This damper provides in addition to the damping effects of the three above described embodiments, adjustability to the resistivity of the woven fabric by means of adjusting the formation of the glass fibers, for glass fibers possess electrical insulation properties. In addition, glass fibers possess an excellent thermal resistivity and therefore contribute to damping effects in the relatively high temperature range 50° C. to 80° C. Furthermore, glass fibers are less costly than carbon fibers, providing a cost advantage.

The damper of yet a further embodiment includes as a resistor a laminated layer of a woven fabric layer and a non-woven fabric layer. This damper provides, in addition to effects of the first three above described embodiments more excellent damping effects than conventional ones in the temperature range 30° C. to 40° C., and retains excellent damping effects up to the temperature as high as nearly 80° C.

One method of producing a damper of the present invention does not include carbon powder, thus eliminating the mixing process, and therefore the damping composition provides a good productivity.

For the other method a damper can be made to yield a desired shape by means of selecting the desired mold.

What is claimed is:

1. A vibration damper comprising a high polymer resin sheet wherein said high polymer resin sheet further comprises:
   piezoelectric ceramic powder disposed in said resin sheet to convert vibratory energy, incident to said resin sheet, into electrical energy; and
   cloth containing carbon fibers, wherein said cloth is disposed in said resin sheet so as to form a cloth layer within said sheet, said cloth being both conductive and resistive so that the electrical energy being produced by said piezoelectric ceramic powder is converted to thermal energy in the cloth layer thereby dissipating the incident vibratory energy.

2. The vibration damper of claim 1, wherein a desired resistivity is obtained by adjusting both the thickness of the carbon fibers and the density of the cloth layer.

3. The vibration damper of claim 1, wherein said cloth is a woven fabric of carbon fibers.

4. The vibration damper of claim 1, wherein said cloth is a woven fabric comprising a composition of carbon fibers and fibers which have a good electrical resistivity characteristic.

5. The vibration damper of claim 4, wherein said composition is a composition of carbon and glass fibers.

6. A vibration damper comprising:
   first and second high polymer resin layers, wherein a piezoelectric ceramic powder is disposed in said first and said second resin layers, wherein said piezoelectric ceramic powder converts vibratory energy incident to said first and said second resin layers into electrical energy;
   a cloth layer, having a top and bottom surface, said cloth layer containing carbon fibers;
   wherein said first resin layer is bonded to the cloth layer top surface and said second resin layer is bonded to the cloth layer bottom surface so as to form a unitary high polymer resin sheet; and
   wherein said cloth layer is both conductive and resistive so that electrical energy produced by the piezoelectric ceramic powder is converted to thermal energy in said cloth layer, thereby dissipating the incident vibratory energy.

7. The vibration damper of claim 6, wherein a desired resistivity is obtained by adjusting both the thickness of the carbon fibers and the density of the cloth layer.

8. The vibration damper of claim 6, wherein said cloth layer is a woven fabric layer of carbon fibers.

9. The vibration damper of claim 6, wherein said cloth is a woven fabric layer comprising a composition of carbon fibers and fibers which have a good electrical resistivity characteristic.

10. The vibration damper of claim 9, wherein said composition is a composition of carbon and glass fibers.

11. The vibration damper of claim 1, wherein said cloth is a non-woven fabric of carbon fibers.

12. The vibration damper of claim 1, wherein said cloth is a lamination of fabric layers, said lamination having a layer of a woven fabric of carbon fibers and a layer of a non-woven fabric of carbon fibers, a plurality of layers of a woven fabric of carbon fibers and a non-woven fabric of carbon fibers, a plurality of layers of a woven fabric of carbon fibers, or a plurality of layers of a non-woven fabric of carbon fibers.

* * * * *

UNITED STATES PATENT AND TRADEMARK OFFICE
CERTIFICATE OF CORRECTION

PATENT NO. : 5,281,470
DATED : January 25, 1994
INVENTOR(S) : Kohji Kobayashi et al.

It is certified that error appears in the above-indentified patent and that said Letters Patent is hereby corrected as shown below:

Col. 6, line 14, after "3" and before "is" insert a space;

Col. 7, line 7, before "polymer", insert --comprises a high--

Col. 7, line 54, before "effects" insert --the damping--.

Signed and Sealed this

Thirteenth Day of September, 1994

Attest:

BRUCE LEHMAN

*Attesting Officer*     *Commissioner of Patents and Trademarks*